United States Patent [19]

Shiu

[11] Patent Number: 5,746,610
[45] Date of Patent: May 5, 1998

[54] GROUND CONTACT FOR A SPLICE ENCLOSURE

[75] Inventor: Leung Man Shiu, Harrisburg, Pa.

[73] Assignee: The Whitaker Corporation, Wilmington, Del.

[21] Appl. No.: 756,862

[22] Filed: Nov. 26, 1996

Related U.S. Application Data

[62] Division of Ser. No. 506,679, Jul. 25, 1995, Pat. No. 5,606,150.

[51] Int. Cl.$^6$ .................................................... H01R 4/66
[52] U.S. Cl. .................................................. 439/98; 439/402
[58] Field of Search .............................. 439/98, 397, 399, 439/401, 402, 403, 497, 579

[56] References Cited

U.S. PATENT DOCUMENTS

| | | | |
|---|---|---|---|
| Re. 26,994 | 12/1970 | Fuller et al. | 174/84 R |
| 3,183,302 | 5/1965 | Wochner et al. | 174/138 |
| 3,383,642 | 5/1968 | Nava et al. | 174/84 R |
| 3,519,731 | 7/1970 | Grunbaum | 174/138 |
| 3,525,799 | 8/1970 | Ellis | 174/84 R |
| 3,656,088 | 4/1972 | Seim | 339/98 |
| 3,715,459 | 2/1973 | Hoffman | 174/138 F |
| 3,718,888 | 2/1973 | Pasternak . | |
| 3,757,031 | 9/1973 | Izraeli | 174/138 F |
| 3,793,612 | 2/1974 | Driscoll | 339/98 |
| 3,804,971 | 4/1974 | Bazille, Jr. | 174/88 R |
| 3,836,944 | 9/1974 | Lawson | 339/99 R |
| 3,869,190 | 3/1975 | Bazille, Jr. | 339/98 |
| 3,879,575 | 4/1975 | Dobbin et al. | 174/92 |
| 3,892,460 | 7/1975 | Izraeli | 339/98 |
| 3,899,236 | 8/1975 | Santos | 339/98 |
| 3,912,356 | 10/1975 | Johansson | 339/98 |
| 3,916,086 | 10/1975 | Gillemot et al. | 174/93 |
| 4,178,055 | 12/1979 | Fleischhacker et al. . | |
| 4,219,693 | 8/1980 | French | 174/135 |
| 4,435,612 | 3/1984 | Smith | 174/92 |
| 4,451,696 | 5/1984 | Beinhaur | 174/92 |
| 4,643,505 | 2/1987 | House et al. | 339/75 P |
| 4,744,629 | 5/1988 | Bertoglio et al. | 174/92 |
| 4,795,857 | 1/1989 | McInnis | 174/138 F |
| 4,859,809 | 8/1989 | Jervis | 174/92 |
| 4,864,725 | 9/1989 | Debbaut | 29/871 |
| 4,879,436 | 11/1989 | Braham | 174/92 |
| 4,891,018 | 1/1990 | Afflerbaugh et al. | 439/402 |
| 4,935,582 | 6/1990 | Calligaris | 174/92 |
| 5,046,766 | 9/1991 | Lomberty et al. | 174/92 |
| 5,071,365 | 12/1991 | Fremgen et al. | 439/402 |
| 5,080,606 | 1/1992 | Burkard | 439/403 |
| 5,111,001 | 5/1992 | Jervis | 174/92 |
| 5,120,235 | 6/1992 | Kashiwa | 439/405 |
| 5,120,246 | 6/1992 | Knox | 439/402 |
| 5,322,973 | 6/1994 | Dagan | 174/92 |
| 5,330,367 | 7/1994 | Janczak | 439/402 |
| 5,347,084 | 9/1994 | Roney et al. | 174/92 |
| 5,371,323 | 12/1994 | Schneider et al. | 174/92 |
| 5,397,859 | 3/1995 | Robertson et al. | 174/92 |
| 5,410,105 | 4/1995 | Tahara et al. | 174/92 |
| 5,415,562 | 5/1995 | Matsumoto et al. | 439/397 |
| 5,446,241 | 8/1995 | Mackaness et al. | 174/91 |
| 5,561,269 | 10/1996 | Robertson | 174/92 |

FOREIGN PATENT DOCUMENTS

| | | |
|---|---|---|
| WO 94/09533 | 4/1994 | WIPO . |
| WO 95/02267 | 1/1995 | WIPO . |

*Primary Examiner*—Gary F. Paumen

[57] ABSTRACT

An enclosure (10) having a pair of covers (12,14) fastenable together to close about and seal a cable splice (200,300) between end portions of a pair of multiconductor shielded cables (202,204;302,304) in either a butt-splice or in-line arrangement A pair of routing channels (24,26) are provided at a first end (20) and a single routing channel (28) at the second end (22), with a splice-receiving region (90) provided adjacent inner ends (44,46,50) of the routing channels. A grounding region (100) between inner ends of the routing channels (24,26,28) includes a ground contact (102) having two pairs of cable-receiving slots (110,112;114,116) each pair being aligned with a respective routing channel for ends of respective cables to be received thereinto with at least one of the slots engaging an exposed shield portion of the cable.

3 Claims, 8 Drawing Sheets

GROUND CONTACT FOR A SPLICE ENCLOSURE

This application is a Divisional of application Ser. No. 08/506,679 filed Jul. 25, 1995, now U.S. Pat. No. 5,606,150.

FIELD OF THE INVENTION

The present invention relates to the field of electrical connections, and more particularly to enclosures for spliced cable connections.

BACKGROUND OF THE INVENTION

For electrical cables having a plurality of discrete conductor wires surrounded by an outer jacket, splices of the conductor wires to associated conductor wires of a like cable are occasionally necessary. Such splice connections are desirably insulatively covered in a manner sealing the splices of the individual wire pairs from the environment and most especially from moisture. It is also desirable to place the cable splice connection in an enclosure that provides physical protection to the several splices. One such enclosure is disclosed in U.S. Pat. No. 5,397,859 wherein sealant material within the enclosure assuredly embeds and seals the coaxial cable connector splicing the two coaxial cable ends together. Latches along both sides of the enclosure halves assuredly latch the halves together along both sides eliminating reliance on the integrally molded hinge along one of the sides.

U.S. Patent No. 5,371,323 discloses a splice housing apparatus for splicing multiconductor shielded cable. The cables enter the enclosure and the several conductors are broken out from the cables and spliced, while portions of the shield are exposed. A ground contact within the enclosure provides a common ground between the shields when the shielded cable portions are inserted into cable-receiving slots of the contact. Sealant material embeds the splices for protection against moisture. Several embodiments provide for same-end cable entrance, where the same contact grounds the shields, or opposite end cable entrance, where there is a ground contact at each end with the contacts then commoned by a shorting bar.

It is desired to provide a single enclosure that permits either butt-splice or in-line cable arrangements as desired on site without special tools.

SUMMARY OF THE PRESENT INVENTION

The present invention is an enclosure for a splice connection of a pair of cables, especially multi-conductor cables having ground shields all within outer jackets. A pair of cover members are securable together around the cable ends to enclose the splice connections of the several conductor wires broken out from the outer jackets and the shield members, and preferably includes sealant material to embed and seal the splice connections and the end portions of the cables. A ground contact mounted within one of the covers is adapted to establish electrical connections with the exposed shield portions of both cables to common them. Preferably a plurality of embossments are disposed throughout the inside surfaces of the cover members, with free ends of the embossments virtually meeting upon closure to provide support against crushing the walls of the cover members, so that the enclosure is suitable for use with underground placement of the cable splice.

Two routing channels extend from a first end of the enclosure, and one routing channel extends from the second end, to inner ends adjacent a splice region between the first and second ends. For an in-line cable arrangement, one cable end is placed into one of the two routing channels at the first end, and the other is placed in the single channel at the second end. Alternatively, both cables can be placed into respective ones of the two channels of the first end for a parallel cable arrangement. Preferably the walls defining the routing channels include a pair of angles so that the cables must be bent upon being urged thereinto, defining strain relief characteristics Both side edges of the covers include cooperating latch sections so that the cover members latch to each other along both sides upon closure about a cable splice, relieving dependence on the integral hinge joining the two cover members as a unitary piece. A plug section may be molded to one of the covers at a frangible section to be broken off and plugged into the unused one of the cable entrances.

The ground contact includes a pair of opposed plate sections extending from a common body section affixed to one of the cover members at the inner ends of the routing channels Each plate section has a pair of cable-receiving slots aligned with each other and with the inner ends of the one or two routing channels, with each aligned pair to receive a respective cable end extending along a cable path from a routing channel inner end, one slot to engage the cable end at an end of the outer jacket and one slot to engage the exposed shield member and establish an electrical connection therewith thus commoning the shield members of both cables. Discrete conductors are broken out of one of the cables beyond the ground contact to be spliced to associated conductors of the other cable and to be disposed in a splice-receiving region adjacent the grounding region. Sealant material of the enclosure will embed the conductor splices, the ground contact and all of the exposed metal of the cable splice.

The preferred ground contact is another aspect of the present invention. Outer portions of the plate sections of the contact between each cable-receiving slot and the end of the contact are effectively cantilever beams, with relief slots formed into the median of the body section, extending inwardly from each end parallel to the plate sections at least to the centerline of the aligned cable-receiving slot pair, and the joint of the outer plate portions is reduced in width to facilitate flexing. Thus the cable-receiving slots can be dimensioned so that either slot of each pair will establish an assured compression engagement with the cable shield member, and also so that the other slot of the pair will permit receipt of the larger diameter outer jacket thereinto.

It is an objective of the present invention to provide an enclosure for a splice connection of a pair of multi-conductor shielded cables.

It is another objective for such enclosure to permit either butt-splice or in-line cable arrangements.

It is an additional objective for the enclosure to comprise a single part to be manipulated and applied as a unit, alleviating any problem of various parts being misplaced or lost.

It is also an objective for such enclosure to provide inherent resistance to crushing, and also contain sealant material to establish an environmentally sealed splice connection.

A further objective of the present invention is to provide an enclosure having a grounding region adapted to establish a ground interconnection between the shield members of the cables being spliced.

It is also a further objective to provide a ground contact with optimal ability to establish assured ground connections with the cable shield members merely upon insertion of the cable splice into the enclosure.

Additionally, it is an objective to provide such a ground contact with a second cable-receiving slot for each cable, providing the enclosure with enhanced strain relief benefits.

Embodiments of the present invention will now be described by way of reference to the accompanying drawings.

DETAILED DESCRIPTION OF THE PREFERRED EMBODIMENTS

Figure 1:
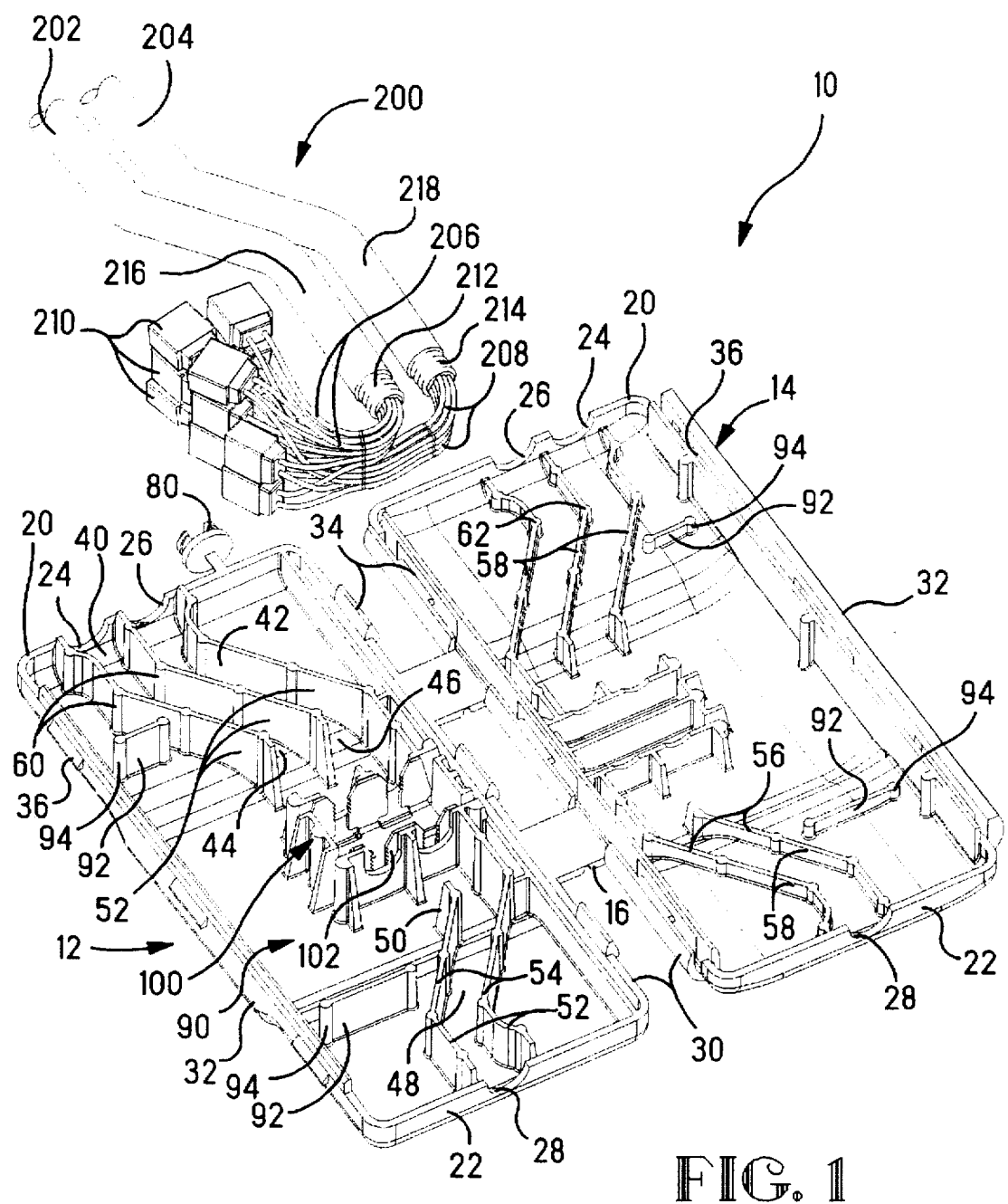
FIGS. 1 and 2 are isometric views of the enclosure of the present invention opened to receive a spliced cable pair in a butt-splice arrangement, with the spliced cable pair shown above the enclosure in FIG. 1 and fully inserted in FIG. 2.
Figure 2:
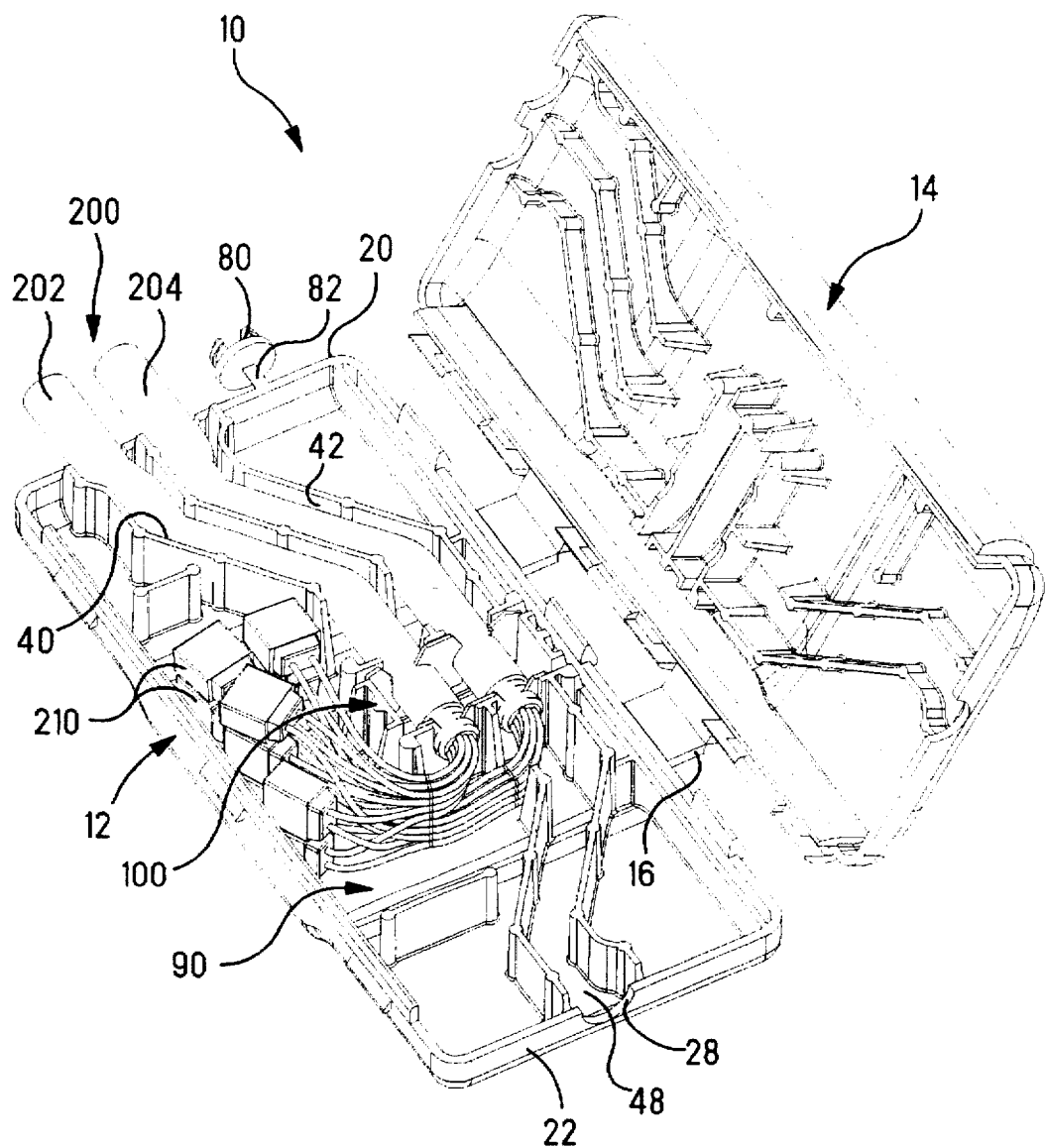
Figure 3:
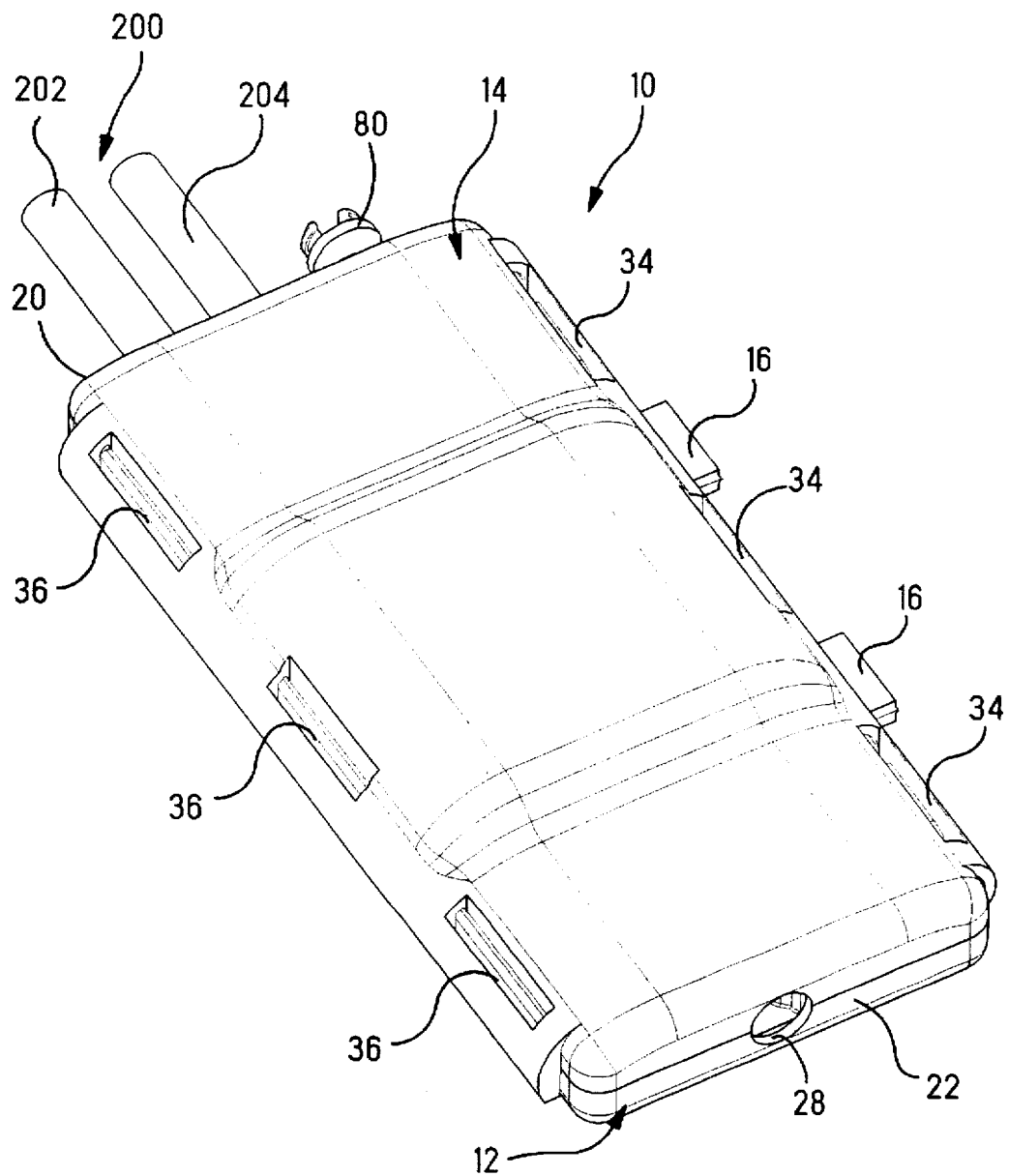
FIG. 3 is an isometric view of the enclosure of FIGS. 1 and 2 after closure about the cable splice.
Figure 4:
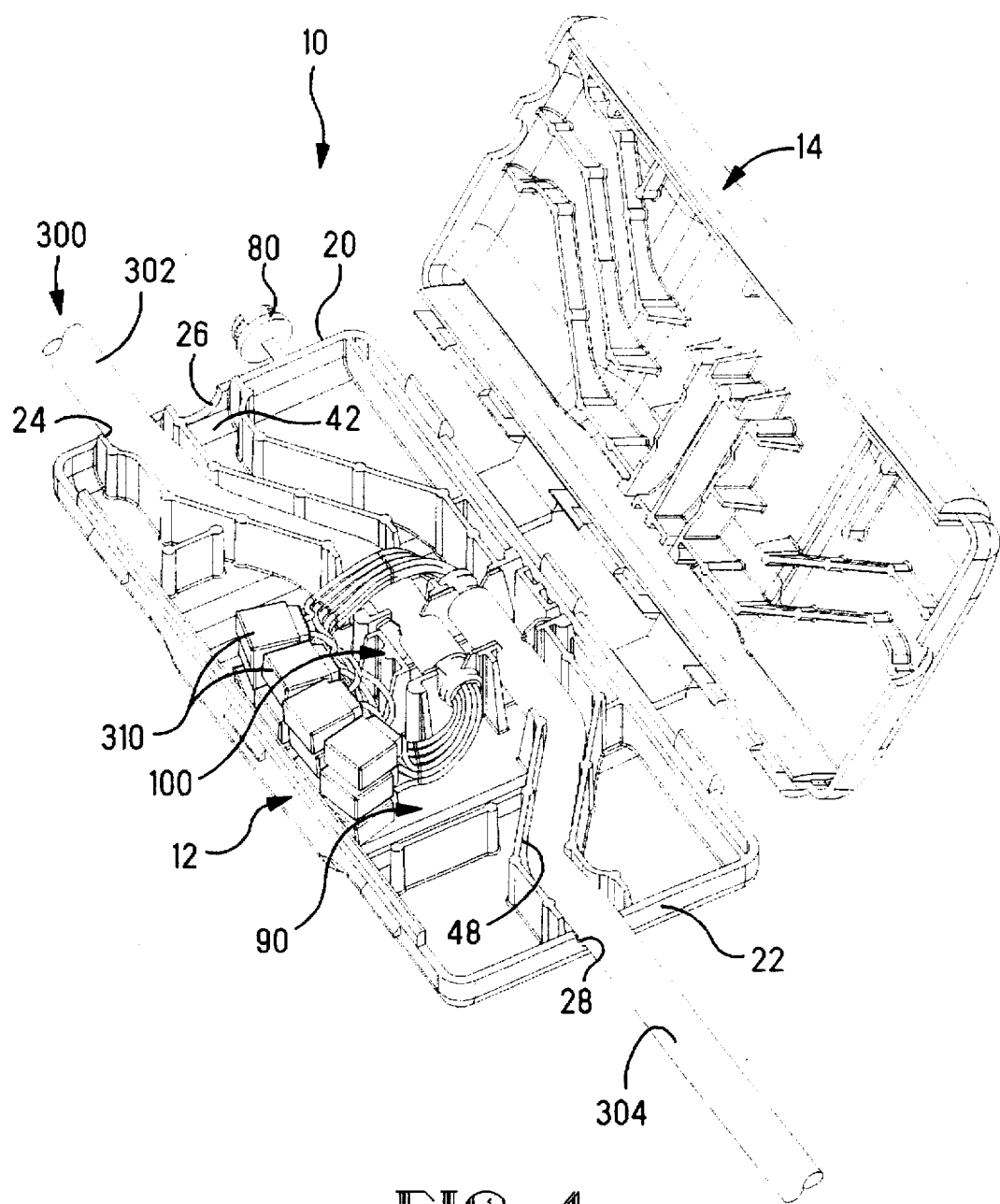
FIGS. 4 and 5 are similar to FIGS. 2 and 3 for an in-line spliced cable pair arrangement.
Figure 5:
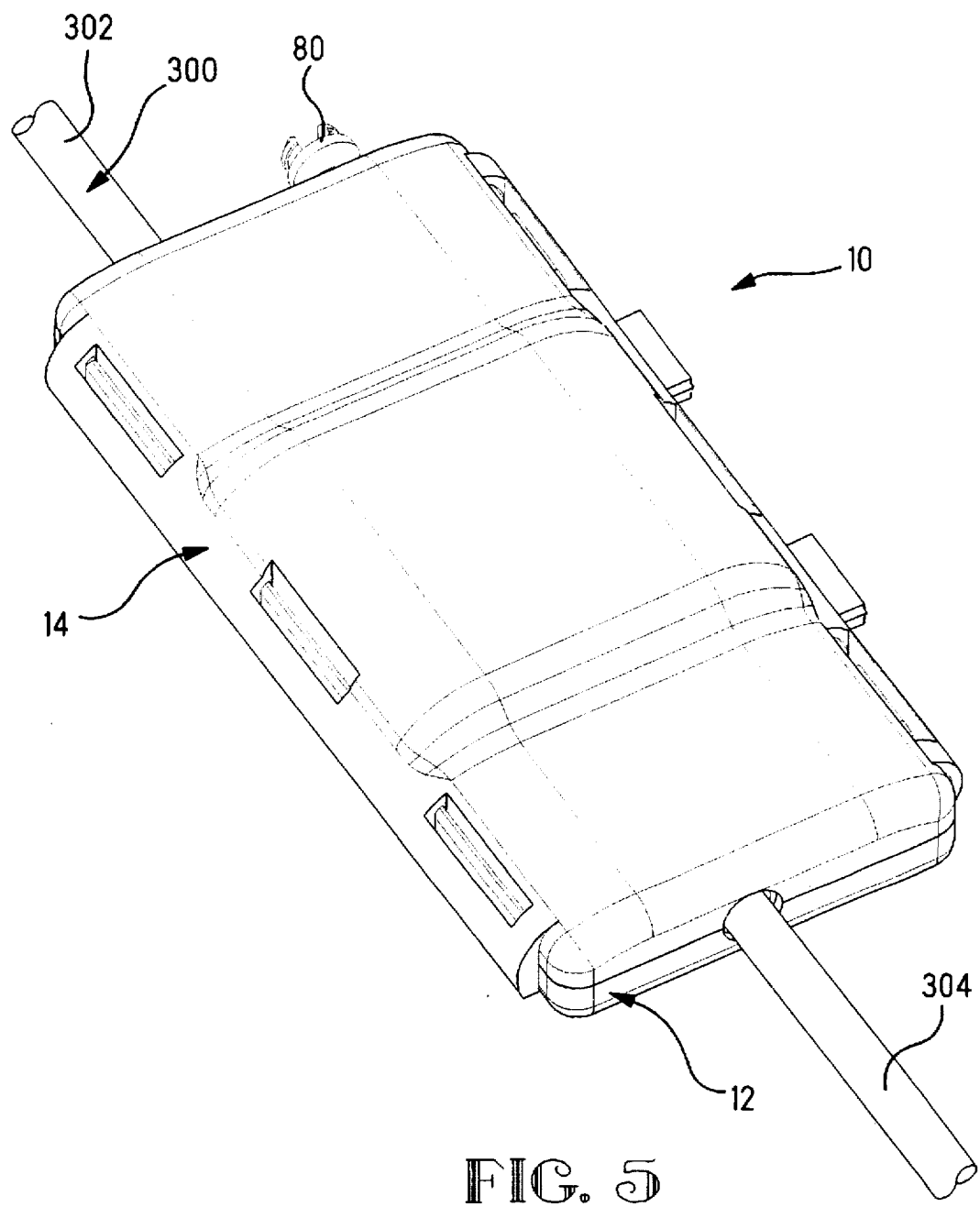

Enclosure 10 of the present invention comprises first and second cover members 12,14 adapted to be closed together about a cable splice to fully enclose the cable splice for sealing therearound and for physical protection thereof. Preferably cover members 12,14 are molded as an integral member joined at a living hinge section 16 facilitating handling as a single unit prior to and during application. First end 20 and second end 22 are provided with cable entrances, first end 20 having a pair of cable entrances 24,26 and second end 22 having a single cable entrance 28. Side walls 30,32 of cover members 12,14 are dimensioned and shaped to abut upon full closure about a cable splice to enable sealing, and cooperating latch sections 34,36 along both side walls 30,32 will secure the cover members to each other so that living hinge section 16 is relieved of any demand to maintain side walls 30 together. Further, the side walls 30,32 of the respective covers cooperate upon full closure in an interleaved arrangement, with a wall of one received into a channel of the other along each edge for assured sealing, preventing egress of sealant material.

Grounding region 100 and splice-receiving region 90 are defined in the interior of the enclosure, with grounding region 100 containing a ground contact 102 affixed thereat to first cover 12. Sealant material is preferably disposed in both first and second cover members 12,14 to fill splice-receiving region 90 and grounding region 100 upon full closure about a cable splice.

Spliced cable pair 200 is seen positioned above enclosure 10 in FIG. 1 at first end 20. Each cable 202,204 has a plurality of discrete conductor wires 206,208 with associated ones thereof spliced together at splice connections 210.

Surrounding all the conductor wires are shield members 212,214 of the cables (such as in corrugated or armored cable), and outer jackets 216,218 surrounding the respective shield members have been trimmed to expose portions of the shield members. The conductor wires 206,208 are shown broken out of the respective cable ends, extending from the cable ends for selected lengths so that splice connections 210 may be positioned within splice-receiving region 90 near grounding region 100. Spliced cable pair 200 is shown in a parallel arrangement for a butt-splice, with both cables to extend from a common first end 20 of the enclosure.

A pair of routing channels 40,42 are shown defined in first end 20 coextending from cable entrances 24,26 to respective inner ends 44,46. A single routing channel 48 is defined at second end 22 extending from cable entrance 28 to an inner end 50. The routing channel inner ends are adjacent grounding region 100 with inner ends 44,46,50 aligned so that cable paths of the routing channels will traverse grounding region 100 for establishing ground connections of the ground contact 102 with the shield members of the cables. Side walls 52 of first cover 12 along routing channels 40,42,48 are dimensioned and positioned for free edges 54 thereof to virtually meet free edges 56 of side walls 58 of second cover 14 and thus completely enclose the routing channels about the cables for minimizing ingress of water from the cable entrances and also for minimizing egress of sealant material from splice-receiving region 90 and grounding region 100. Support embossments 60,62 are spaced along side walls 52,58 both to enhance the rigidity of side walls to resist deformation or deflection when cables are disposed along the routing channels, and also for free ends thereof to virtually meet upon full closure of enclosure 10 about the cable splice to support the cover members inwardly from the side walls to prevent crushing, thereby imparting crush resistance to the enclosure such that the enclosure is suitable to be placed in service underground that commonly means that a cable splice enclosure will commonly be placed under compression.

Figure 6:
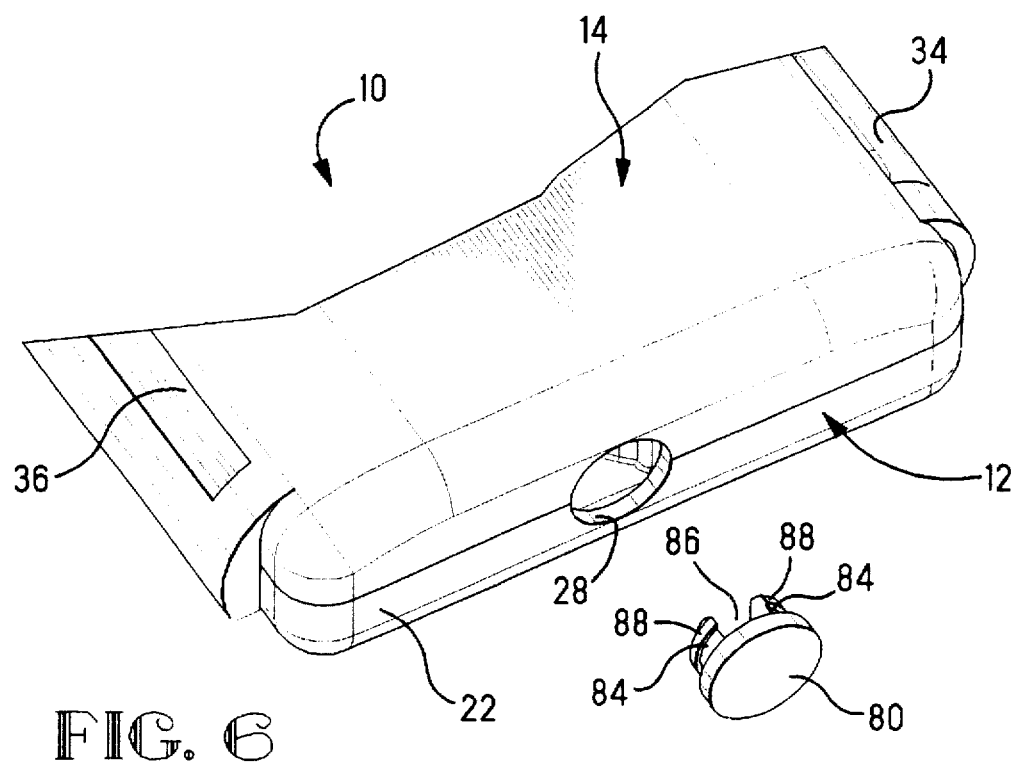
FIGS. 6 and 7 are isometric views of the plug prior to insertion into the unused cable entrance, and afterward, respectively.
Figure 7:
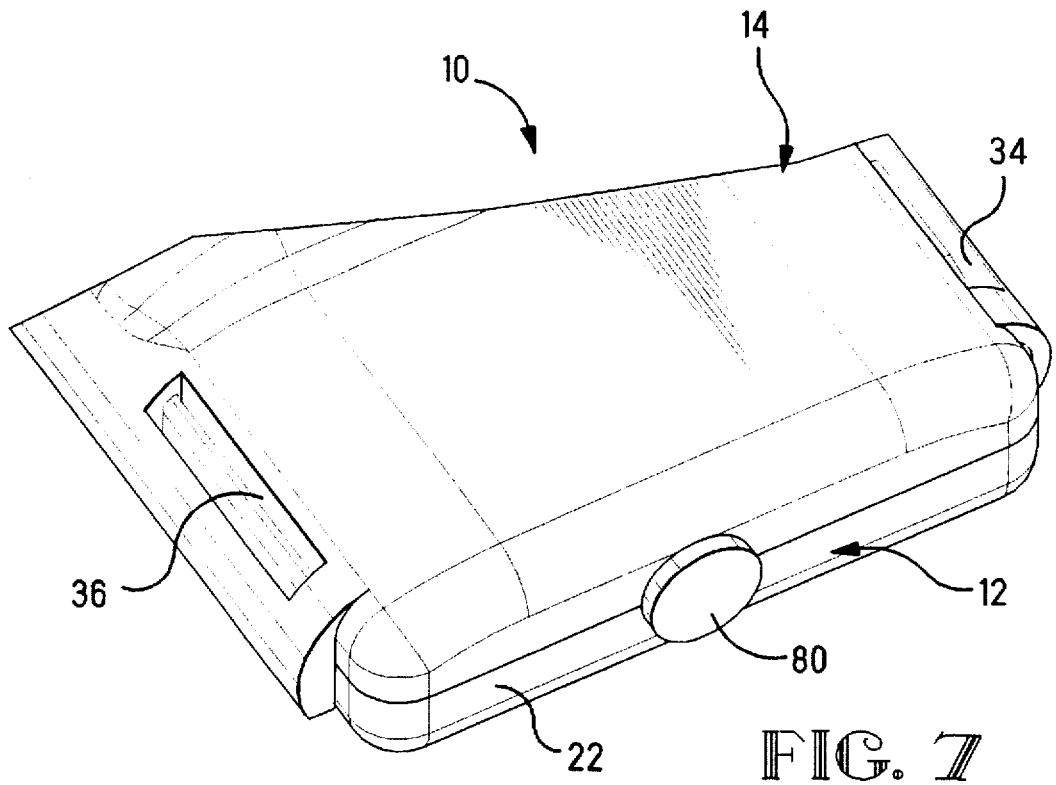

A plug member 80 is seen preferably initially attached integrally to first cover 12 by a frangible section 82, and is easily detachable for use in sealing the unused one of cable entrances 26,28. Referring to FIGS. 6 and 7, plug member 80 is provided with a pair of tines 84 separated by a slot 86. The outer diameter of the semicylindrical tines 84 is selected to match the diameter of the cable entrances, and free ends of the tines are widened and define latching sections 88. Upon insertion of the tines into the cable entrance, the widened free ends are deflected toward each other and upon full insertion resile for latching of latching sections 88 to the periphery of the cable entrance within the enclosure, thus closing off the entrance.

Figure 8:
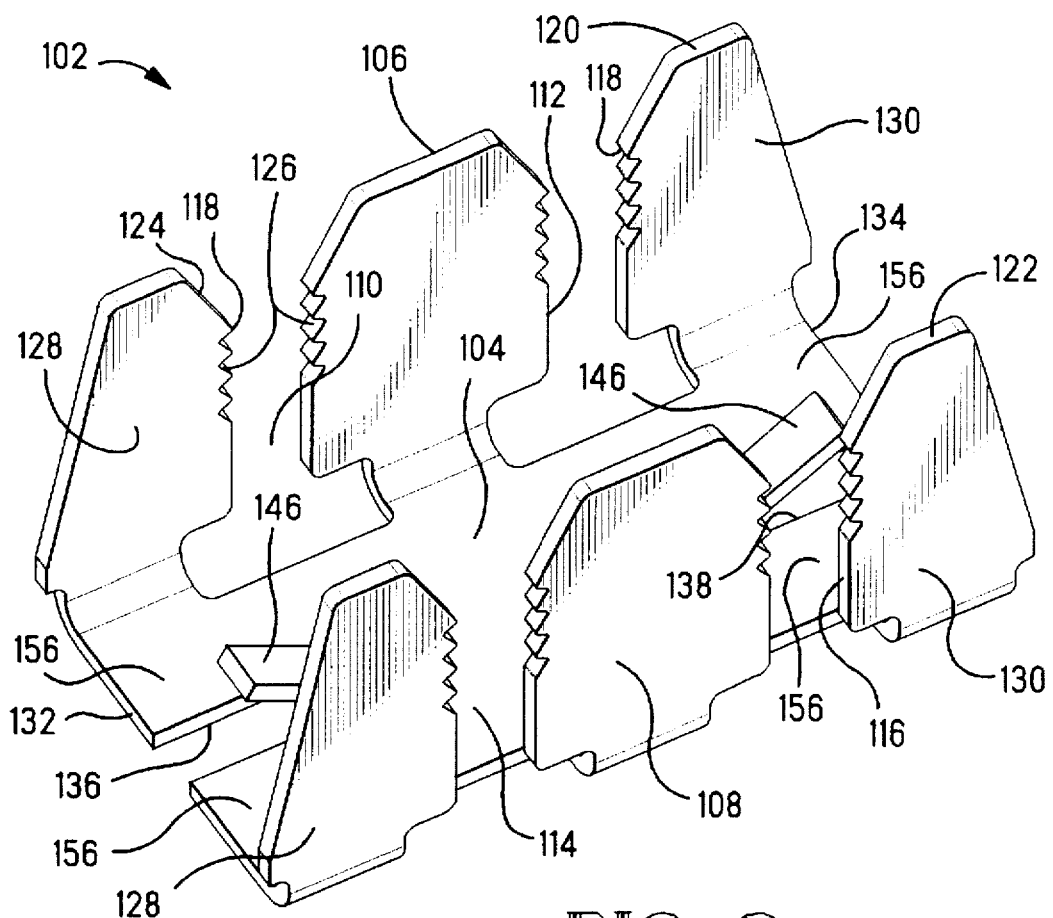
FIG. 8 is an isometric view of the ground contact of the present invention.
Figure 9:
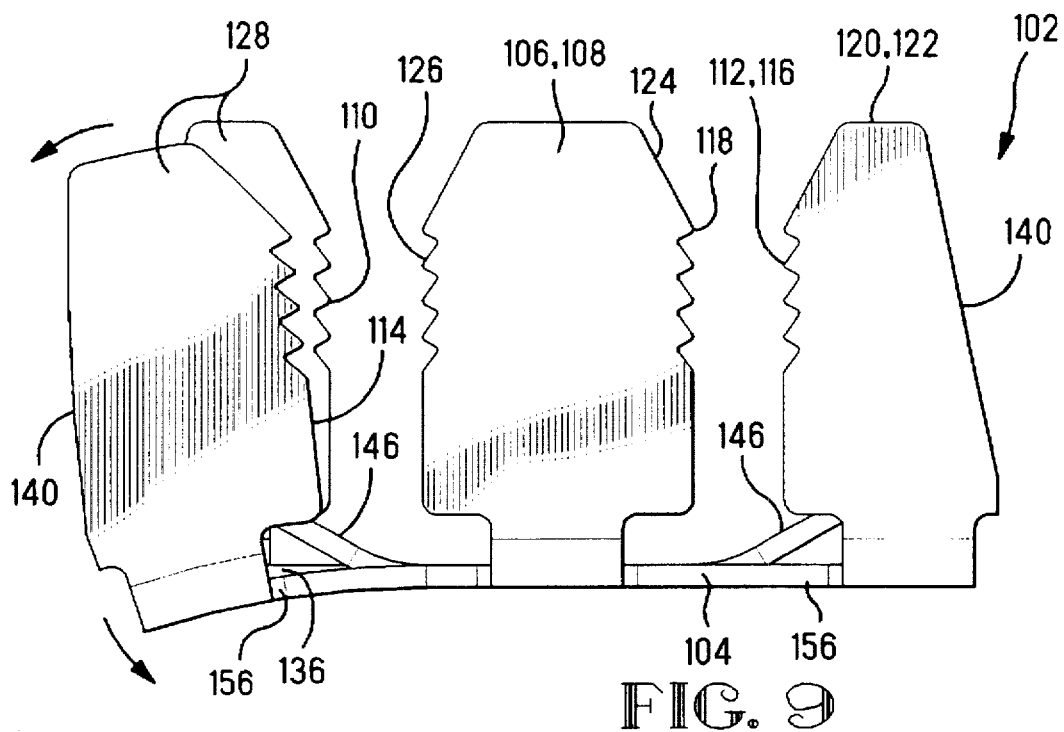
FIG. 9 is an elevation view of the ground contact demonstrating deflection of an outer plate portion thereof when a cable would be received into a cable-receiving slot thereof.
Figure 10:
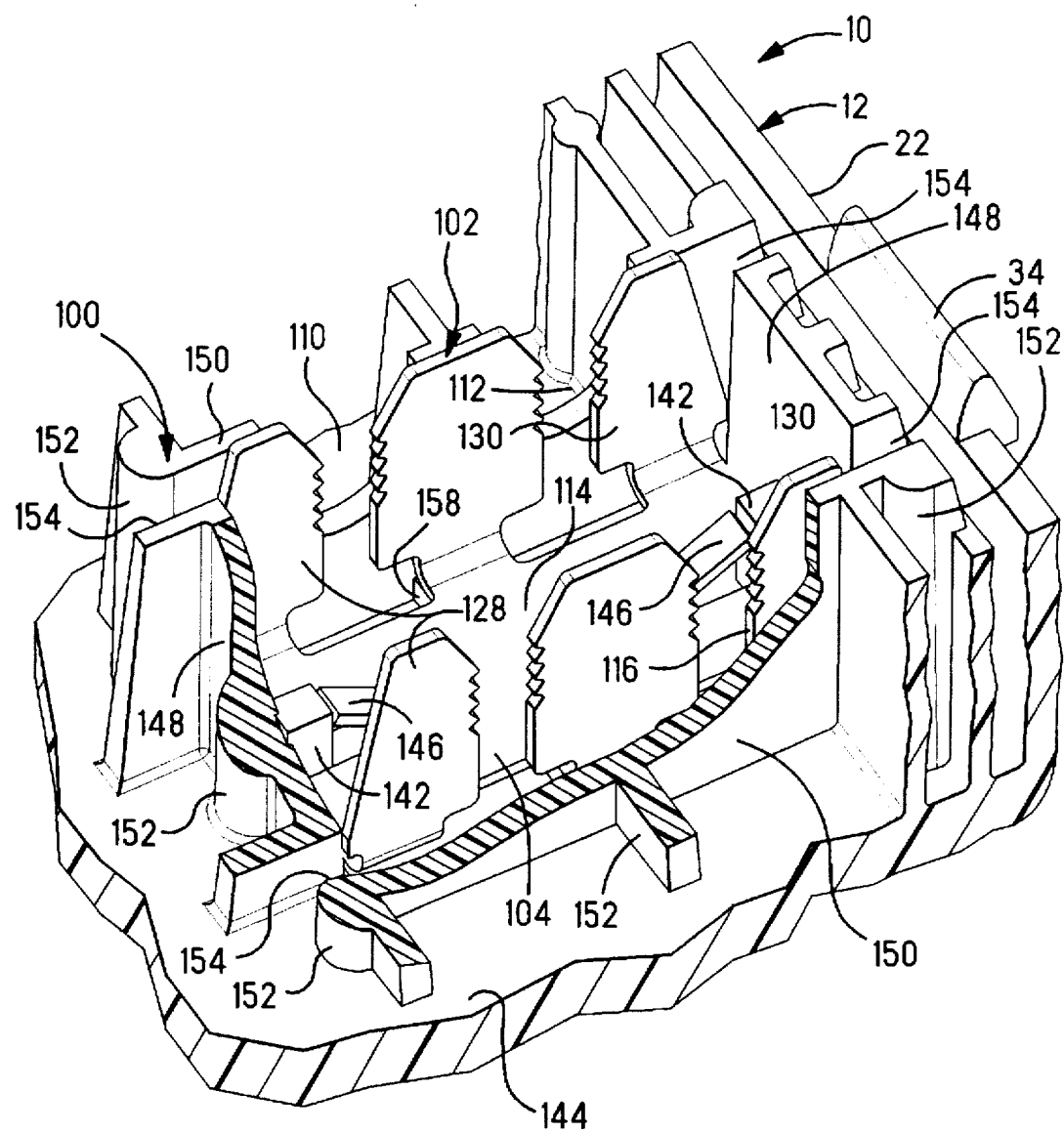
FIG. 10 is an enlarged isometric view of the grounding region of the enclosure illustrating the ground contact affixed to the first cover.

Grounding region 100 is best seen in FIG. 10 with ground contact 102 shown in FIGS. 8 and 9. Ground contact 102 includes a body section 104 and plate sections 106,108 upstanding from opposed edges of body section 104. Plate section 106 includes two cable-receiving slots 110,112 and plate section 108 includes two cable-receiving slots 114,116, all extending from entrances 118 at upper edges 120,122 to the body section 104. The centerlines of cable-receiving slots 110 and 114 are aligned with each other in an associated pair for receipt of the same cable end portion thereinto when the centerlines are aligned with a cable path during application of enclosure 10 to a cable splice connection, and likewise slots 112 and 116 are coaligned and associated as a pair for receipt of another cable end portion thereinto. Preferably slot entrances 118 are provided with widened mouths 124 to facilitate insertion of a cable thereinto, and facing edges along each slot include serrations 126 that will bite into a cable shield sufficiently to establish an assured around connection therewith upon cable insertion.

Ground contact 102 is preferably adapted to permit the plate portions to flex or be pivoted during cable insertion. Joints of the plate sections with body section 104 are shown to be narrowed, especially at plate portions 128,130 adjacent ends 132,134 of body section 104. Further, relief slots 136,138 are formed in body section 104 extending from ends 132,134 to at least the centerlines of the cable-receiving slots adjacent the respective ends 132,134, defining cantilever beams 156. It can be said that plate portions 128,130 are defined on ends of cantilever beams 156 that can flex, so that the plate portions are pivoted outwardly from the cable-receiving slots as seen in FIG. 9 upon insertion of respective cable end portions into the cable-receiving slots. Outer side edges 140 are shown tapered for clearance when a plate portion is pivoted. Additionally, ribs 158 are formed along bottom surface 144 of first cover 12 (seen in FIG. 10) to elevate body section 104 of ground contact 102 to create clearance beneath cantilever beams 156 permitting deflection downwardly upon cable insertion into the cable-receiving slots When a cable end portion is inserted into a respective pair of slots 110,114 or 112,116, the exposed shield portion will be received into one of the slot pair, while a jacketed portion of the cable will be received into the other. The ground contact is adapted to accommodate receipt of the shield portion into one slot of the slot pair while the larger diameter jacketed portion is received into the other slot. With plate portions 128,130 being pivotable, the same slot width can accommodate either diameter and also variations in diameter tolerance during manufacture of the cable.

Referring particularly to FIG. 10, ground contact 102 may be affixed to first cover 12 by utilizing a pair of embossments 142 extending upwardly from inner surface 144 of first cover 12, with each embossment being received through a respective aperture of body section 104 or through outer ends of relief slots 136,138. Ground contact 104 is also shown having a pair of stiff lances 146 extending in opposite directions struck upwardly from body section 104 at relief slots 136,138 having free ends that will engage and form an assured interference fit against embossments 142 when the ground contact is forced into position in grounding region 100 of first cover 12, preferably with application tooling striking the lances after assembly of the ground contact to first cover 12 to firmly embed the free ends into the embossments. Other fastening techniques could be utilized such as heat staking the embossments to the body section or use of other fastening accessories or adhesive. Preferably, ground contact 102 is stamped and formed of copper alloy such as brass for good conductivity, and having a thickness of about 0.030 inches for stiffness; alternatively, stainless steel could be used. Sealant material preferably is deposited in the splice-receiving regions of both the first and second covers, and also into the grounding regions thereof, such as gel-like sealant material disclosed in European Patent Publication No. 0 529 957.

Grounding region 100 of first cover 12 is generally enclosed within upstanding wall sections 148 parallel to sidewalls 20,22 and upstanding wall sections 150 perpendicular thereto. Preferably upper edges of the wall sections will meet corresponding edges of corresponding wall sections of second cover 14, and preferably embossments 152 are provided along wall sections of both covers that meet and thus provide crush-resistance in the center of enclosure 10 upon closure about a cable splice. Gaps 154 are also seen to be provided around the periphery of grounding region 100 that permit extrusion of sealant material therethrough upon closure of the covers about the cable splice connection and also minimize interfering engagement with pivoting plate portions of ground contact 102 secured within the upstanding wall sections 148,150 of first cover 12. First and second covers 12,14 are also seen to include upstanding wall sections 92 and embossments 94 adjacent splice-receiving region 90 that enhance crush-resistance of the enclosure and also serve to inhibit flow of sealant material out of the splice-receiving region, as seen in FIG. 1.

Variations and modifications may be devised that are within the spirit of the invention and the scope of the claims.

What is claimed is:

1. A ground contact for commoning electrical engagement of shields of at least a pair of shielded cables, comprising:
    a unitary metal member having a body section and opposed first and second plate sections extending orthogonally from side edges of said body section to free edges,
    at least two cable-receiving slots extending from said free edges of each of said first and second plate sections to said body section, the cable-receiving slots of said first plate section being substantially aligned with the cable-receiving slots of said second plate section defining aligned pairs associated with a common said cable, and each said aligned pair being associated with an adjacent end edge of said body section, and
    said body section including relief slots extending inwardly from respective said end edges thereof at least to centerlines of said associated pair of cable-receiving slots,
    whereby the portions of said first and second plate sections adjacent associated said end edges of said body section and adjacent portions of said body section generally form cantilever beams having deflectability during insertion into said cable-receiving slots of said cables.

2. The ground contact of claim 1 wherein inner edges of said first and second plate sections along said cable-receiving slots are serrated.

3. The ground contact of claim 1 wherein entrances to said cable-receiving slots are widened to define lead-ins facilitating initial cable insertion thereinto.

* * * * *